Feb. 10, 1959  D. MOST  2,873,409
PORTABLE HIGH VOLTAGE POWER SUPPLY
Filed Nov. 24, 1954
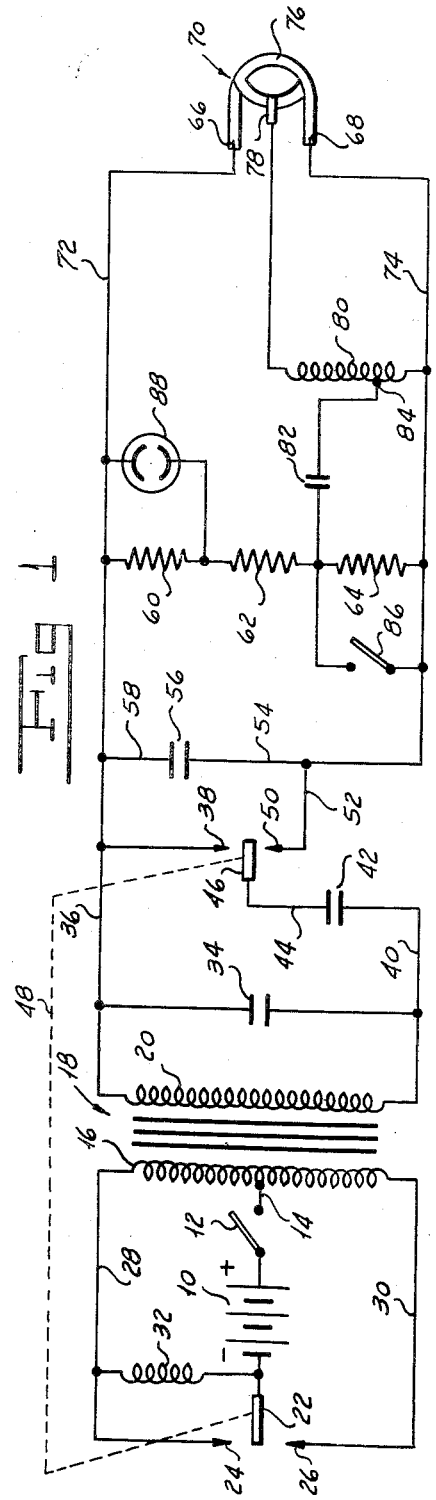
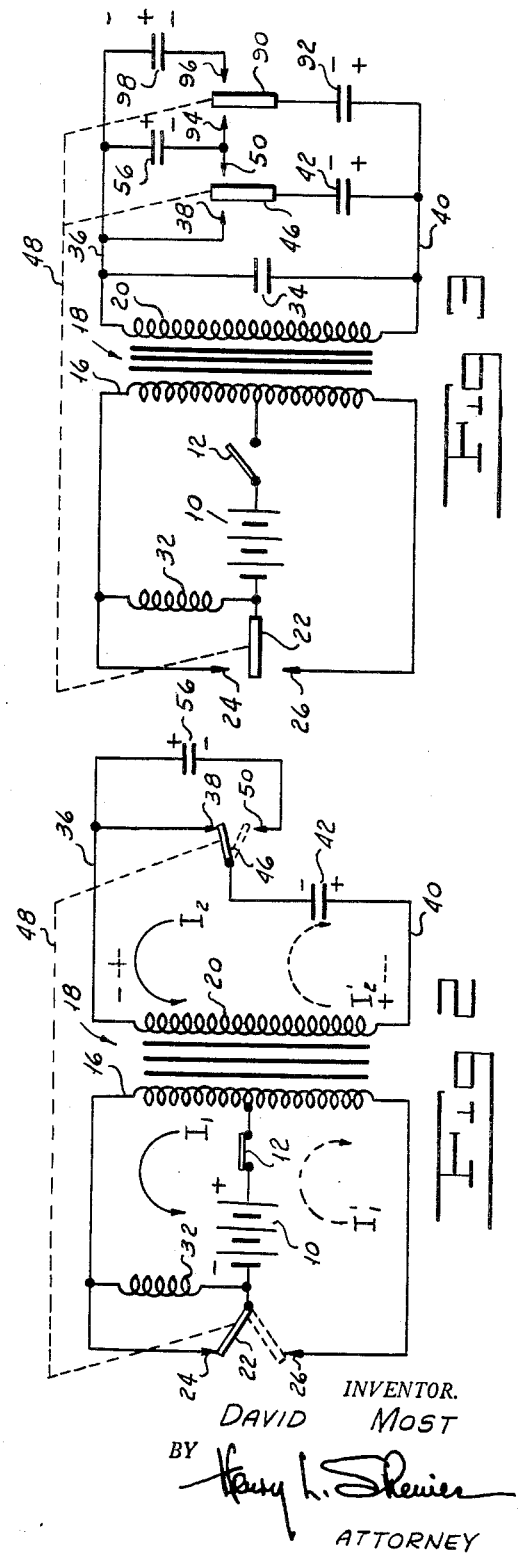
INVENTOR.
DAVID MOST
BY
ATTORNEY

2,873,409

PORTABLE HIGH VOLTAGE POWER SUPPLY

David Most, Brooklyn, N. Y., assignor, by mesne assignments, to Rush Instrument Co., Inc., New York, N. Y., a corporation of New York Application November 24, 1954, Serial No. 470,886

10 Claims. (Cl. 315—219)

My invention relates to a portable high voltage power supply and more particularly to a portable high voltage direct current power supply which is compact and lightweight for use with electronic photoflash equipment.

Portable high voltage power supplies have a wide range of application. They may, for example, be employed as potential sources for gas-filled electronic photoflash tubes. The operation of these tubes is such that, with a predetermined potential impressed between the plate and cathode electrodes of the tube, a high potential pulse applied to the ionizing electrode ionizes the gas within the tube, causing the tube to fire. The plate-to-cathode potential may be provided by a capacitor which is charged from the potential source and discharged through the tube when it fire. The required plate-to-cathode potential for these tubes is much higher than that provided by a dry cell of the types which are presently available. It may be as high as 450 volts. Consequently, portable electronic photoflash tube power supplies of the prior art employ a number of large cells to achieve the required high potential. These power supplies of the prior art are heavy, bulky, and not easily carried.

I have invented a portable high voltage direct current power supply which provides a voltage sufficiently high to fire an electronic photoflash tube. My power source employs small batteries of the flashlight variety and is, consequently, smaller and lighter than power supplies of the prior art.

One object of my invention is to provide a portable high voltage power supply which is small and lightweight.

Another object of my invention is to provide a portable high voltage power supply which produces a voltage sufficiently high to fire an electronic photoflash tube.

A further object of my invention is to provide a novel photoflash assembly.

Other and further objects of my invention will appear from the following description.

In general, my invention contemplates the provision of a portable high voltage power supply including a first vibrator armature for alternately connecting a source of direct current potential across the respective upper and lower portions of a center-tapped transformer primary winding to induce equal and opposite voltages in the transformer secondary winding on alternate operations of the first vibrator armature. A second vibrator armature, mechanically ganged with the first armature, alternately connects a first capacitor across the transformer secondary winding and connects this first capacitor in series with a second capacitor across the secondary winding. I provide means for vibrating the armatures in unison at a predetermined rate to charge the first capacitor to a voltage which is equal to the maximum voltage induced in the secondary winding and to charge the second capacitor to a voltage which is twice the maximum voltage induced in the secondary winding. If desired, additional capacitors may be connected in the secondary winding circuit to treble and quadruple the maximum induced voltage in the secondary winding. In one appliation of my power supply, I apply the output voltage from the last of the capacitors in the secondary circuit to the input terminals of an electronic photoflash tube firing circuit. I provide an improved triggering system for firing the photoflash tube. When the tube is fired, this capacitor is discharged through the tube. Before the tube can again be fired, this last capacitor must again be charged to its maximum value.

In the accompanying drawings which form part of the instant specification and which are to be read in conjunction therewith and in which like reference numerals are used to indicate like parts in the various views:

Figure 1 is a schematic view of one form of my high voltage power supply in combination with my improved triggering circuit for firing an electronic photoflash tube.

Figure 2 is a simplified schematic view of the form of the improved portable high voltage power supply shown in Figure 1.

Figure 3 is a schematic view of a second form of my improved portable high voltage power supply.

More particularly referring now to Figure 1 of the drawings, my portable high voltage power supply includes a source of direct current potential which may be a battery 10 or the like. A switch 12 connects the positive terminal of battery 10 to a centar tap 14 on the primary winding 16 of a transformer, indicated generally by the reference character 18. Transformer 18 includes a secondary winding 20. The negative terminal of battery 10 is connected to a vibrating armature 22 with which a pair of contacts 24 and 26 are associated. Respective conductors 28 and 30 connect contacts 24 and 26 to the terminals of winding 16. A vibrator coil 32 is connected between conductor 28 and armature 22.

A buffer capacitor 34, connected across secondary winding 20, gives a smooth crossover of transformer secondary voltage during the time when the vibrator armatures are open. It prevents sparking and high frequency transients at the break and at the make of the contacts.

A conductor 36 connects a contact 38 to one side of winding 20. A conductor 40 connects one plate of a capacitor 42 to the other side of winding 20. A conductor 44 connects a vibrating armature 46 to the other plate of capacitor 42. Armatures 22 and 46 are coupled by a linkage 48 which is operated by coil 32 in a manner to be described hereinafter. A second contact 50 associated with armature 46 is connected by conductors 52 and 54 to one plate of a second capacitor 56. A conductor 58 connects the other plate of capacitor 56 to conductor 36.

As will be explained in detail hereinafter, after a predetermined number of vibrations of the vibrating armatures 22 and 46, capacitor 56 has a voltage thereon which is sufficient to fire an electronic photoflash tube after its gas has been ionized by the application of an ionizing or triggering pulse to the ionizing electrode of the tube. As can be seen by reference to Figure 1, I connect capacitor 56 across the input terminals of the firing circuit of an electronic photoflash tube. The firing circuit includes series connected resistors 60, 62, and 64 connected between the plate electrode 66 and cathode electrode 68 of the electronic photoflash bulb, indicated generally by the reference character 70. A conductor 72 connects resistor 60 to electrode 66, and a conductor 74 connects resistor 64 to electrode 68. Conductors 72 and 74 are connected, respectively to conductors 58 and 54 to apply the potential across capacitor 56 to the voltage divider including resistors 60, 62, and 64. Tube 70 includes a gas-filled envelope 76 about which I arrange an ionizing electrode 78 adjacent the mid-point of the envelope. From the structure thus far described, it will be seen that the entire voltage across capacitor 56 is applied across the respective plate and cathode electrodes 66 and 68 of the tube 70. With this plate-to-cathode potential a high potential pulse applied to ionizing electrode 78 ionizes the gas within the envelope 76 and causes the tube to fire. In order to provide potential for the ionizing or triggering pulse I connect an autotransformer 80 between electrode 78 and conductor 74. I connect a capacitor 82 between a tap 84 on the autotransformer 80 and the common terminal of resistors 62 and 64. From these connections it can be seen that capacitor 82 is charged to a potential which is equal to the voltage drop across resistor 64. I connect a normally open switch 86 between the common terminal of resistors 62 and 64 and conductor 74. When switch 86 is closed, capacitor 82 is discharged through the portion of winding 80 below tap 84. As a result of this discharge, a high potential pulse is generated in the high side of the autotransformer 80. This pulse is applied to the ionizing electrode 78 of tube 70 to fire the tube. I connect a neon glow lamp 88 or the like across resistor 60. This lamp glows to indicate that capacitor 56 has been charged to its maximum potential.

In Figure 2 I have shown a simplified schematic diagram by means of which the operation of my power supply may readily be explained. Vibrator coil 32, when energized, operates linkage 48 to raise armatures 22 and 46 to the up or full-line positions shown in Figure 2 where they engage respective contacts 24 and 38. In this position of the armatures, a high current $I_1$ flows through the upper portion of winding 16 in the direction indicated by the arrow in Figure 2. As a consequence of this current flow $I_1$, a voltage $E_0$ of a polarity indicated by the solid-line polarity marks is induced in secondary winding 20. This induced voltage causes a current flow $I_2$ in the secondary winding 20 in the direction of the arrow in the figure. Current $I_2$ charges capacitor 42 to a voltage $E_1$ having a polarity such that the lower plate of capacitor 42 is positive and the upper plate is negative, as indicated in the figure. After a predetermined number of vibrations of the armatures 22 and 46, a stable or equilibrium condition is reached and voltage $E_1$ is equal to, but of opposite polarity to, the voltage $E_0$.

When armature 22 has been moved to the up or full-line position shown in Figure 2, the circuit of vibrator coil winding 32 is broken and armature 22 is permitted to fall to the broken-line position shown in Figure 2. In this position of armature 22 a small energizing current flows through winding 32 to return armatures 22 and 46 to the full-line position. As armature 22 alternately is pulled up and permitted to fall, the circuit of winding 32 is alternately broken and made. When armatures 22 and 46 are in the broken-line position, a heavy current $I_1'$ flows through the lower half of winding 16 in the direction shown in Figure 2. This current flow induces a voltage $E_0$ of a polarity indicated by the broken-line polarity markings in winding 20. It will be remembered that when the stable condition is reached, the capacitor 42 is charged to a potential $E_0$ having a polarity as indicated in Figure 2. This potential is in series aiding relationship with the potential $E_0$ induced in winding 20 when armatures 22 and 46 are in the down position. These two potentials result in a current flow $I_2'$ in the direction of the arrow in Figure 2. Current $I_2'$ charges capacitor 56 to a potential $E_2$ of a polarity such that the upper plate of capacitor 56 is positive and the lower plate is negative. When a stable or equilibrium condition is reached whereat there is no transfer of charge no matter how many times armatures 22 and 46 vibrate, potential $E_2$ equals twice $E_0$. It is to be noted further that since the voltage doubling takes place by virtue of the capacitor and vibrator armature action, the turns ratio between winding 16 and winding 20 need not be great so that the transformer 18 may be small and inexpensive.

In Figure 3 I have shown a further form of my invention in which additional multiplication of the voltage takes place. In this form of my invention I provide a third vibrating armature 90 also operated by winding 32 through linkage 48. I connect a capacitor 92 between armature 90 and conductor 40. I connect a first contact 94 associated with armature 90 to the plate of capacitor 56 to which contact 50 is connected. I connect the other contact 96 associated with armature 90 to one plate of a fourth capacitor 98, the other plate of which is connected to line 36. As has been explained hereinabove, after a predetermined number of vibrations of armatures 22 and 46, capacitor 56 has a voltage $E_2$ thereon, which is twice the voltage $E_0$ induced in secondary winding 20. This voltage $E_2$ is of such a polarity that the upper plate of capacitor 56 is positive and the lower plate is negative. When armature 90 engages contact 94, armature 22 engages contact 24 and a voltage $E_0$, having a polarity which is in series aiding relationship to the polarity of voltage $E_2$, is induced in secondary winding 20. These two potentials cause such a current flow in the loop including capacitor 92 that capacitor 92 eventually attains a potential $E_3$ which is equal to the sum of $E_0+E_2$, which sum is equal to $3E_0$. After capacitor 92 has achieved the potential $3E_0$ armature 90 engages contact 96. At the same time, armature 22 engages contact 26 and a voltage $E_0$, of a polarity which aids the voltage $E_3$ on capacitor 92, is induced in winding 20. These two potentials cause such a current flow in the loop including capacitor 98 that it is charged to a potential which is equal to the sum of the potential on capacitor 92 and the potential $E_0$. At equilibrium the potential on capacitor 98 is $4E_0$.

In operation of the form of my invention shown in Figure 1, switch 12 is closed. If armature 22 is in the down position where it engages contact 26, an energizing current flows through winding 32 to urge armature 22 to the up position where it engages contact 24. When armature 22 engages contact 24, it shorts winding 32 to de-energize the winding and permit armature 22 to drop to the position where it engages contact 26. As winding 32 is alternately energized and de-energized, armature 22 vibrates between contacts 26 and 24.

Assuming armature 22 and armature 46 to be in the up or full-line positions shown in Figure 2, a large current $I_1$ in the direction of the arrow in Figure 2 flows through the upper half of primary winding 16. This transient current flow induces a potential $E_0$ of a polarity indicated by the full-line polarity markings in the secondary winding 20 of transformer 18. This induced voltage $E_0$ causes a current flow $I_2$ in the direction of the arrow in Figure 2. As a result of the flow of current $I_2$, capacitor 42 is charged to a potential $E_1$ of a polarity indicated in Figure 2. After a predetermined number of vibrations of armatures 22 and 46, potential $E_1$ equals the potential $E_0$ and an equilibrium position is reached. When armatures 22 and 46 are in the lower or broken-line positions shown in Figure 2, a voltage $E_0$ of a polarity indicated by the broken-line polarity markings is induced in winding 20. It can be seen that this voltage has a polarity which is in series aiding relationship with the polarity of the potential $E_1$ on capacitor 42. These two voltages result in a current flow $I_2'$ in the direction of the arrow in Figure 2 to charge capacitor 56 to a potential $E_2$ having a polarity as indicated in the figure. At equilibrium, when capacitor 42 has been charged to a potential which is equal to $E_0$, the potential across capacitor 56 must be equal to $2E_0$ if the sum of the voltage drops and rises around the loop including capacitors 42 and 56 and winding 20 is to be equal to zero. Thus the capacitor and vibrating armature action has effectively doubled the maximum induced potential in secondary winding 20.

As shown in Figure 1, this voltage across capacitor 56 is applied to the voltage divider including resistors 60, 62, and 64. When capacitor 56 has been charged to its maximum of equilibrium value, lamp 88 glows to indicate that the tube is ready for firing. Capacitor 82 is charged to a potential which is equal to the voltage drop across resistor 64. When the photoflash tube 70 is to be fired, switch 86 is closed to discharge triggering capacitor 82 through the portion of autotransformer winding 80 below the tap 84. This discharge induces a high voltage in the high side of the autotransformer winding, which voltage is applied to the ionizing electrode 78 of tube 70. It will be remembered that the potential across capacitor 56 is applied between electrodes 66 and 68 of tube 70 by conductors 72 and 74. As soon as the gas in envelope 76 is ionized by the application of the autotransformer pulse to electrode 78, the tube fires and capacitor 56 discharges through the tube. Before tube 70 can again be fired, capacitor 56 must be recharged to its maximum or equilibrium potential. Glow lamp 88 indicates when the capacitor 56 has been recharged.

The operation of the form of my invention shown in Figure 3 is similar to that of the form of my invention shown in Figure 1. As has been explained hereinabove, after a predetermined number of vibrations of armatures 22 and 46, capacitor 56 is charged to a potential which is substantially twice the maximum induced voltage in the secondary winding 20 of the transformer 18. When this condition has been achieved and armature 90, which is ganged with armatures 22 and 46, engages contact 94, a voltage $E_0$ is induced in winding 20 which is of a polarity in series aiding relationship with the potential to which capacitor 56 has been charged. In order that the sum of the voltage drops and rises around the loop including capacitors 56 and 92 and winding 20 be zero when the equilibrium condition is reached, capacitor 92 must be charged to a potential which is equal to the sum of the potential to which capacitor 56 has been charged and the voltage induced in winding 20. This potential to which capacitor 92 is charged will be substantially equal to three times the maximum induced voltage $E_0$ in winding 20. When capacitor 92 has been charged to its maximum potential in the stable condition of the circuit and when armature 90 engages contact 96, a potential $E_0$, having a polarity which is in series aiding relationship with the potential across capacitor 92, is induced in winding 20. In order that the sum of the voltage drops and rises around the loop including capacitors 92 and 98 and winding 20 be equal to zero, capacitor 98 must be charged to a potential which is equal to the sum of the potential to which capacitor 92 has been charged and the maximum induced voltage in winding 20. This potential to which capacitor 98 is charged is substantially four times the maximum induced voltage in winding 20. This potential to which capacitor 98 has been charged may be applied to the electronic photoflash tube firing circuit in the same manner in which the potential across capacitor 56 is shown as being applied to the firing circuit in Figure 1. It is to be understood that within practical limits as many capacitors and vibrating armatures as are necessary to provide the desired voltage multiplication may be employed.

It will be seen that I have accomplished the objects of my invention. I have provided a portable high voltage power supply which is capable of generating a direct current voltage which is sufficiently high to fire an electronic photoflash tube. I have provided an improved triggering circuit for firing electronic photoflash tubes. Because of the voltage multiplication provided by my capacitor and vibrating armature action I may employ small dry cells, such as flashlight batteries or the like, for the source of direct current potential 10. Further, since I do not rely on the turns ratio of transformer 18 to provide the voltage multiplication I achieve, I may employ a relatively small transformer. For these reasons my portable high voltage power supply is lighter in weight and smaller in size than are portable power supplies of the prior art which provide a voltage of the same magnitude. While I have shown my portable high voltage power supply as being employed in connection with an electronic photoflash tube, it will readily be understood that it may be used for any application requiring such a supply.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described

Having thus described my invention, what I claim is:

1. A photoflash assembly for firing an electronic photoflash tube including in combination an impedance, generating means adapted to be actuated alternately to produce a voltage of a given polarity across said impedance and for producing a voltage having a polarity opposite to said given polarity across said impedance, a first capacitor, a second capacitor, means adapted to be actuated alternately to connect said first capacitor across said impedance and to connect said first and second capacitors in series across said impedance, means for actuating said generating means and said capacitor connecting means in unison, and a triggering system connected between said second capacitor and said photoflash tube.

2. A high voltage power supply including in combination an impedance, generating means adapted to be actuated alternately to produce a voltage of a given polarity across said impedance and for producing a voltage having a polarity opposite to said given polarity across said impedance, a first capacitor, a second capacitor, means adapted to be actuated alternately to connect said first capacitor across said impedance and to connect said first and second capacitors in series across said impedance, and means for actuating said generating means and said capacitor connecting means in unison.

3. A high voltage power supply as in claim 2 in which each of said first and second capacitors is formed by a pair of elements, said impedance including a pair of terminals, said capacitor connecting means including means connecting a first element of said first capacitor to one of said impedance terminals, means connecting a first element of said second capacitor to the other of said impedance terminals, an armature, a pair of contacts alternately engageable by said armature, means connecting the other of said first capacitor elements to said armature, means connecting the other of said second capacitor elements to one of said contacts, and means connecting the other of said contacts to said other of said impedance terminals.

4. A high voltage power supply including in combination a source of direct current potential, a transformer having a primary winding and a secondary winding, means dividing said primary winding into two parts, means adapted to be actuated alternately to connect said source of potential across one of said two parts and across the other of said two parts, a first capacitor, a second capacitor, means adapted to be actuated alternately to connect said first capacitor across said secondary winding and to connect said first and second capacitors in series across said secondary winding, and means for actuating said potential source connecting and said capacitor connecting means in unison.

5. A high voltage power supply as in claim 4 in which said means dividing said primary winding into two parts is a center tap, said source of potential including a pair of terminals, one of said source terminals being connected to said center tap, said means for connecting said sources of potential including an armature and a pair of contacts engageable by said armature, means connecting the other terminal of said source to said armature, said primary winding including a pair of terminals, and means respectively connecting said contacts to said primary winding terminals.

6. A high voltage power supply as in claim 4 in which said means dividing said primary winding into two parts is a center tap, said source of potential including a pair of terminals, a manually operable switch connecting one of said source terminals to said center tap, said means for connecting said source of potential including an armature and a pair of contacts engageable by said armature, means connecting the other terminal of said source to said armature, said primary winding including a pair of terminals, and means respectively connecting said contacts to said primary winding terminals.

7. A high voltage power supply as in claim 4 in which each of said first and second capacitors is formed by a pair of elements, said secondary winding including a pair of terminals, said capacitor connecting means including means connecting a first element of said first capacitor to one of said secondary terminals, means connecting a first element of said second capacitor to the other of said secondary terminals, an armature, a pair of contacts alternately engageable by said armature, means connecting the other of said first capacitor elements to said armature, means connecting the other of said second capacitor elements to one of said contacts, and means connecting the other of said contacts to said other of said secondary terminals.

8. A high voltage power supply as in claim 4 in which said means dividing said primary winding into two parts is a center tap, said source of potential including a pair of terminals, one of said source terminals being connected to said center tap, said means for connecting said source of potential including an armature and a pair of contacts engageable by said armature, means connecting the other terminal of said source to said armature, said primary winding including a pair of terminals, means respectively connecting said contacts to said primary winding terminals, and an armature winding connected between said armature and one of said contacts.

9. A high voltage power supply including in combination a source of direct current potential, a transformer having a primary winding and a secondary winding, means dividing said primary winding into two parts, means adapted to be actuated alternately to connect said source of potential across one of said two parts and across the other of said two parts, a plurality of first capacitors, a plurality of second capacitors, each of said first and second capacitors including a pair of elements, said secondary winding including a pair of terminals, means connecting one element of each of said first capacitors to one terminal of said secondary winding, means connecting one element of each of said second capacitors to the other terminal of said secondary winding, means adapted to be actuated alternately to connect the other element of each of said first capacitors to said other secondary winding terminal and to a respective other element of one of said second capacitors, and means for operating said source connecting means and said last-mentioned capacitor element connecting means in unison.

10. A high voltage power supply including in combination an impedance, generating means adapted to be actuated alternately to produce a voltage of a given polarity across said impedance and to produce a voltage having a polarity opposite to said given polarity across said impedance, a plurality of first capacitors, a plurality of second capacitors, each of said first and second capacitors including a pair of elements, said impedance including a pair of terminals, means connecting one element of each of said first capacitors to one terminal of said impedance, means connecting one element of each of said second capacitors to the other terminal of said impedance, means adapted to be actuated alternately to connect the other element of each of said first capacitors to said other impedance terminal and to a respective other element of one of said second capacitors, and means for operating said generating means and said last-mentioned capacitor element connecting means in unison.

References Cited in the file of this patent

UNITED STATES PATENTS

| | | |
|---|---|---|
| 1,992,908 | Cockcroft et al. | Feb. 26, 1935 |
| 2,072,272 | Schade | Mar. 2, 1937 |
| 2,231,873 | Barrett | Feb. 18, 1941 |
| 2,255,299 | Rockwell | Sept. 9, 1941 |
| 2,262,819 | Rosser | Nov. 18, 1941 |
| 2,347,165 | Aust | Apr. 25, 1944 |
| 2,384,829 | Garstang | Sept. 18, 1945 |
| 2,384,830 | Garstang | Sept. 18, 1945 |
| 2,384,831 | Garstang | Sept. 18, 1945 |
| 2,447,832 | Abend et al. | Aug. 24, 1948 |
| 2,449,214 | Gelzer | Sept. 14, 1948 |
| 2,622,229 | Lord | Dec. 16, 1952 |
| 2,631,249 | Smith | Mar. 10, 1953 |
| 2,703,376 | Board | Mar. 11, 1955 |